(12) United States Patent
Wang et al.

(10) Patent No.: US 9,821,798 B2
(45) Date of Patent: Nov. 21, 2017

(54) HYBRID VEHICLE ENGINE STARTS

(71) Applicant: Ford Global Technologies, LLC, Dearborn, MI (US)

(72) Inventors: Xiaoyong Wang, Novi, MI (US); Wei Liang, Farmington Hills, MI (US); Rajit Johri, Ann Arbor, MI (US); Mark Steven Yamazaki, Canton, MI (US); Ming Lang Kuang, Canton, MI (US); Ryan Abraham McGee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 47 days.

(21) Appl. No.: 14/741,846

(22) Filed: Jun. 17, 2015

(65) Prior Publication Data

US 2015/0283997 A1 Oct. 8, 2015

Related U.S. Application Data

(62) Division of application No. 14/057,311, filed on Oct. 18, 2013, now Pat. No. 9,086,045.

(51) Int. Cl.
*B60W 20/00* (2016.01)
*B60W 10/02* (2006.01)
(Continued)

(52) U.S. Cl.
CPC ................... *B60W 20/40* (2013.01);
*B60W 10/02* (2013.01);
*B60W 10/023* (2013.01);
*B60W 10/06* (2013.01);
*B60W 10/08* (2013.01);
*B60W 20/10* (2013.01); *F02N 11/08* (2013.01); *F02N 11/0803* (2013.01); *B60W 2540/10* (2013.01); *B60W 2710/06* (2013.01); *B60Y 2300/73* (2013.01); *B60Y 2400/426* (2013.01); *F02N 5/04* (2013.01); *F02N 11/00* (2013.01);
(Continued)

(58) Field of Classification Search
None
See application file for complete search history.

(56) References Cited

U.S. PATENT DOCUMENTS 6,335,574 B1 * 1/2002 Ochiai .................... B60K 6/48
290/17
7,079,942 B2  7/2006 McGee et al.
(Continued)

*Primary Examiner* — Rami Khatib
(74) *Attorney, Agent, or Firm* — David B. Kelley; Brooks Kushman P.C.

(57) ABSTRACT

A vehicle includes a starter motor, an engine having an output mechanically coupled to the starter motor, a transmission having an input, and an electric machine mechanically coupled to the transmission input. The vehicle further includes a clutch configured to mechanically couple the electric machine and the output of the engine, and at least one controller. The at least one controller is programmed to initiate an engine start based on driver demand. The controller is further configured to enable pressure to the clutch for the engine start if driver demand is less than a calibratable torque value or enable the starter motor for the engine start if the driver demand is greater than a calibratable torque value. The controller may lock the clutch to the output of the engine in response to the speed of the engine being approximately equal to the speed of the electric machine.

11 Claims, 3 Drawing Sheets

(51) Int. Cl.
    *B60W 10/06*     (2006.01)
    *B60W 10/08*     (2006.01)
    *B60W 20/40*     (2016.01)
    *F02N 11/08*     (2006.01)
    *B60W 20/10*     (2016.01)
    *F02N 5/04*     (2006.01)
    *F02N 11/00*     (2006.01)
    *F02N 15/02*     (2006.01)

(52) U.S. Cl.
    CPC ......... *F02N 11/0818* (2013.01); *F02N 15/022* (2013.01); *F02N 2200/023* (2013.01); *F02N 2200/101* (2013.01); *F02N 2300/2002* (2013.01); *Y02T 10/6286* (2013.01); *Y10S 903/902* (2013.01); *Y10S 903/93* (2013.01)

(56) References Cited

U.S. PATENT DOCUMENTS

| | | |
|---|---|---|
| 7,229,381 B2 | 6/2007 | Niessen et al. |
| 7,896,114 B2 | 3/2011 | Colvin et al. |
| 2004/0029677 A1* | 2/2004 | Mori ................ B60K 6/485 477/3 |
| 2004/0055800 A1* | 3/2004 | Katou ................ B60K 6/26 180/65.26 |
| 2009/0312895 A1* | 12/2009 | Kim ................ B60K 6/365 701/22 |
| 2012/0083952 A1* | 4/2012 | Smith ................ B60K 6/442 701/22 |
| 2013/0238204 A1* | 9/2013 | Nedorezov ........ B60W 10/02 701/68 |
| 2014/0221152 A1* | 8/2014 | Tsutsumi .......... B60W 20/40 477/5 |
| 2014/0277890 A1* | 9/2014 | Ideshio ................ B60K 6/48 701/22 |
| 2015/0360673 A1* | 12/2015 | Yoshida ............ B60W 10/06 477/5 |
| 2016/0082824 A1* | 3/2016 | Inoue ................ B60K 6/48 701/22 |
| 2016/0244050 A1* | 8/2016 | Ouchi ................ B60K 6/48 |

\* cited by examiner

HYBRID VEHICLE ENGINE STARTS

CROSS-REFERENCE TO RELATED APPLICATIONS

This application is a division of U.S. application Ser. No. 14/057,311, filed Oct. 18, 2013, publication No. US2015/0112524, now pending, the disclosure of which is hereby incorporated in its entirety by reference herein.

TECHNICAL FIELD

This disclosure relates to systems and methods for controlling an engine start in a hybrid vehicle.

BACKGROUND

Hybrid electric vehicles (HEV) utilize a combination of an internal combustion engine with an electric motor to provide the power needed to propel a vehicle. This arrangement provides improved fuel economy over a vehicle that has only an internal combustion engine. One method of improving the fuel economy in an HEV is to shutdown the engine during times that the engine operates inefficiently, and is not otherwise needed to propel the vehicle. In these situations, the electric motor is used to provide all of the power needed to propel the vehicle. When the driver power demand increases such that the electric motor can no longer provide enough power to meet the demand, or in other cases such as when the battery state of charge (SOC) drops below a certain level, the engine must start quickly and smoothly in a manner that is nearly transparent to the driver.

Starting an engine in an HEV can occur when the vehicle is operating under any one of a number of different conditions. A control strategy for an engine start may be different based on sets of conditions under which the vehicle is operating. The strategy to starting an engine in a HEV may cause the powertrain system to start rough, start sluggishly, cause additional noise and vibration to the powertrain, and/or cause hardware damage to powertrain components. Starting the engine in an HEV when it is moving under the power of the electric motor may cause a noticeable and therefore undesirable torque disturbance in the vehicle driveline. For the hybrid powertrain described above, engine start can be accomplished using different methods, which is the subject of this disclosure.

SUMMARY

A vehicle includes an engine having an output, a transmission having an input, and an electric machine mechanically coupled to the input of the transmission. The vehicle further includes a clutch configured to mechanically couple the electric machine and output of the engine, and at least one controller. The at least one controller is configured to control engine run-up during an engine start by using the electric machine while reducing a pressure supplied to the clutch and decreasing torque transferred across the clutch to zero if driver demand torque is less than a calibratable value. The controller may be furthered configured to maintain the pressure supplied to the clutch to sustain the torque transferred across the clutch if driver demand torque is greater than the calibratable value. The controller may lock the clutch to the output of the engine in response to the speed of the output of the engine being approximately equal to the speed of the electric machine.

A vehicle includes a starter motor, an engine having an output mechanically coupled to the starter motor, a transmission having an input, and an electric machine mechanically coupled to the transmission input. The vehicle further includes a clutch configured to mechanically couple the electric machine and the output of the engine, and at least one controller. The at least one controller is programmed to initiate an engine start based on driver demand. The controller is further configured to enable pressure to the clutch for the engine start if driver demand is less than a calibratable torque value or enable the starter motor for the engine start if the driver demand is greater than a calibratable torque value. The controller may lock the clutch to the output of the engine in response to the speed of the engine being approximately equal to the speed of the electric machine.

A hybrid powertrain engine start method is enabled in response to an engine start request and a temperature associated with an engine being greater than a predefined value. The engine start method may command an increase in pressure supplied to a clutch configured to couple the engine to an operating electric machine. The method may control the pressure supplied to the clutch using a calibratable value based on driver demand torque to start the engine using the operating electric machine.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
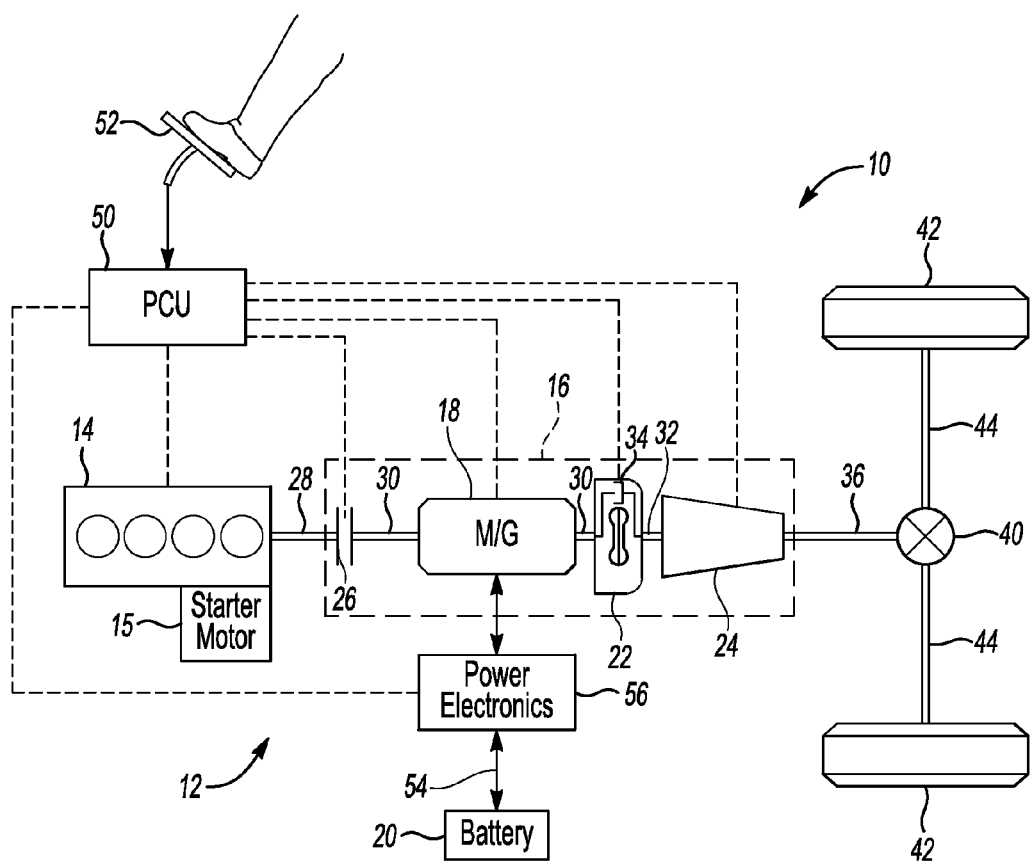
FIG. 1 is a schematic diagram of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The engine may be started using several methods including, but not limited to, a starter motor 15 that engages the flywheel to rotate the engine for starting. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU) 50. The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 50 may communicate signals to and/or from engine 14, disconnect clutch 26, M/G 18, launch clutch 34, transmission gearbox 24, and power electronics 48. Although not explicitly illustrated, those of ordinary skill in the art will recognize various functions or components that may be controlled by PCU 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by PCU 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The PCU 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

Figure 2:
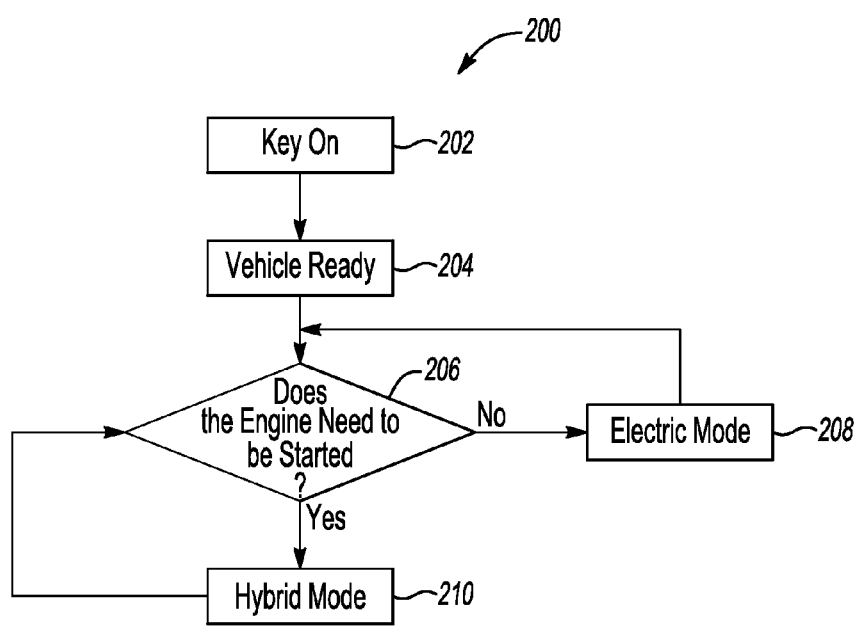
FIG. 2 is a flow chart illustrating a hybrid electric vehicle mode of operation.

FIG. 2 is a flowchart illustrating a hybrid electric vehicle operation. The present disclosure provides a control method for initiating an engine start in a hybrid powertrain system. In a hybrid electric vehicle, there are several input signals that may cause the system to request the engine to turn on including, but not limited to, brake pedal position, accelerator pedal position, battery state of charge (SOC), and/or information related to the transaxle.

At step 202, one or more controllers may receive a request to power the vehicle system by recognizing a key-on event made by a user. The hybrid powertrain system may begin initialization once a key-on is received. The hybrid powertrain system may have several systems, subsystems, and components with parameters and calibratable variables that may need to be initialized before indicating that the vehicle is ready for operation at step 204. The parameters and calibratable variables may include, but are not limited to, a powertrain temperature value, driver demanded torque requested, and/or battery SOC.

At step 206, a determination is made as to whether an engine start is required by the hybrid powertrain system. There may be at least three different engine start modes in a HEV powertrain system, each of which is described in more detail below. It is worth noting that using multiple engine start modes provides an efficient and effective method of implementing the present embodiment and more than three or less than three engine start modes may be implemented in a hybrid powertrain system.

At step 208, the hybrid powertrain system may determine, based on the one or more parameters and calibratable variables received by the systems, subsystems, and/or components, that the vehicle may operate in electric mode. For example, the system may request the SOC of the battery to determine whether the hybrid powertrain system may turn the engine on or run in electric mode. If the battery SOC is at an acceptable level, the electric motor may continue to provide the requested torque for the powertrain system allowing the engine to remain off.

At step 210, the system may receive a high driver demanded torque that exceeds the electric motor(s) capabilities; therefore the hybrid powertrain system may start the engine to assist in the delivery of the requested torque and enter a hybrid mode. For example, the driver and/or one or more vehicle subsystems may be requesting additional torque from the powertrain system. As a result, the engine may be requested on to compensate the additional torque in combination with the electric motor.

The system may select from several methods to engage the engine for starting. The several methods to engage the engine for starting may include, but are not limited to, a starter motor start, a bump start using clutch control, and/or a ramp start using clutch control. Based on the received signals from one or more vehicle system, subsystems, and/or components communicating with the hybrid powertrain system, the engine may be started using one of the several methods.

Once the engine is engaged to start using the one or more methods, the system may command fuel and spark to the engine. Once the engine has been fueled it may begin to produce torque. Although the steps of the flowchart described above are in a particular order, in practice these steps need not be performed in any particular sequence. And in fact, one or more of the steps may be performed concurrently.

Figure 3:
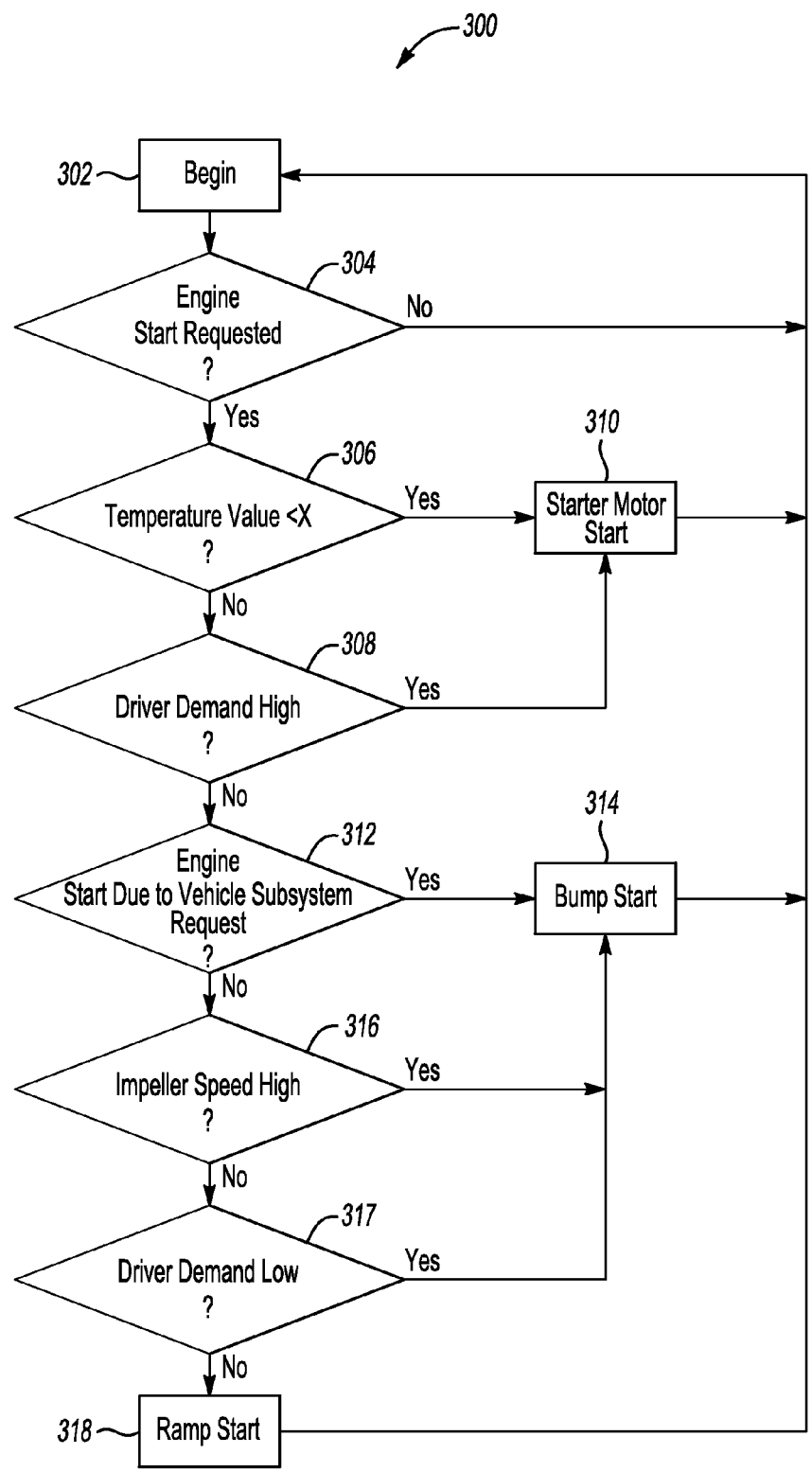
FIG. 3 is a flow chart of an algorithm for determining an engine start method for a hybrid electric vehicle.

FIG. 3 is a flow chart of an algorithm for determining an engine start method for a hybrid electric vehicle. The method is implemented using software code contained within the vehicle control module, according to one or more embodiments. In other embodiments, the method 300 is implemented in other vehicle controllers, or distributed amongst multiple vehicle controllers.

Referring again to FIG. 3, the vehicle and its components illustrated in FIG. 1 are referenced throughout the discussion of the method to facilitate understanding of various aspects of the present disclosure. The method of controlling the start of an engine in the hybrid electric vehicle may be implemented through a computer algorithm, machine executable code, or software instructions programmed into a suitable programmable logic device(s) of the vehicle, such as the vehicle control module, the hybrid control module, other controller in communication with the vehicle computing system, or a combination thereof. Although the various steps shown in the flowchart diagram 300 appear to occur in a chronological sequence, at least some of the steps may occur in a different order, and some steps may be performed concurrently or not at all.

In a hybrid electric vehicle configuration, e.g. modular hybrid transmission (MHT), the engine is connected to the driveline by the disconnect clutch. There are several methods to start an engine with the disconnect clutch including, but not limited to, a bump start and/or a ramp start. Another way to start an engine in a MHT configured hybrid electric vehicle may be with the use of a starter motor.

The bump start may provide smooth torque delivery by allowing precise clutch control. The bump start method allows the disconnect clutch to engage the engine by spinning the crankshaft until it reaches a calibratable speed. Once the engine reaches the calibratable speed, the disconnect clutch disengages the engine. The bump start method may require additional time before the engine is engaged with the electric motor to provide power/torque to the hybrid powertrain system since the engine may have to reach the electric motor speed without any additional assistance from the disconnect clutch. The bump start may also provide limited starting torque since the disconnect clutch is disengaged once the engine speed reaches a calibratable value. For example, the bump method may allow the disconnect clutch to engage the engine to spin the crankshaft to approximately 300-400 revolutions per minute (RPM) before disengaging. The bump start method may have less energy dissipation because of the disengagement during the start.

The ramp start method may be a fast start for the engine to be engaged with the electric motor. The ramp start control method commands the clutch to engage the engine and it may not disengage the engine as the speed is increased to the motor speed. This method allows the electric motor torque to assist with the engine accelerating to meet the electric motor speed. The ramp start method may limit the life of the clutch because of the high clutch energy caused by engaging the engine with the electric motor at a high speed differential.

Using the disconnect clutch to start the engine in a hybrid powertrain system (e.g. the modular hybrid transmission configuration) may cause torque holes because part of the motor torque is used to start the engine. For example, a high torque request may cause the motor to become saturated when it is engaging to start the engine therefore providing less torque to the driveline.

The starter motor method may provide high start torque for the engine when it is requested to be turned on by the hybrid powertrain system. The starter motor allows for a fast start of the engine. It, however, may cause noise and vibration on the powertrain system. The starter motor method for a hybrid powertrain system may have additional inaccuracies including not allowing an engine start at certain engine speeds and having durability concerns between the starter/flywheel components. The starter motor may have a durability issue if it is the only source to turn the engine on in an MHT vehicle.

At step 302, the hybrid powertrain system may request to turn the engine on based on several reasons including, but not limited to, battery state of charge, additional torque requested by a driver or the system, and/or driving maneuvers that may improve fuel economy with the engine on. The system may receive the information to determine if the engine needs to be turned on based on one or more factors including, but not limited to, battery state of health, battery state of charge, electric motor capability, and/or other vehicle system capabilities/status. The system may determine whether or not to turn the engine on at step 304. If the system does not need to turn the engine on, or has not received a request, the system may continuously monitor one or more signals to determine if the engine is requested on at step 302.

At step 306, the hybrid powertrain system may control an engine start request by monitoring engine coolant temperature and/or transmission oil temperature to determine which method to use for starting the engine. If the temperature value of the engine coolant and/or transmission oil is less than a calibratable value, the system may request the starter motor method to engage the engine at step 310. If the temperature value of the engine coolant and/or transmission oil is greater than a calibratable value, the system may look at one or more other values before determining an engine start method.

At step 308, the system may determine if the driver demanded torque is high, if so the starter motor method may be requested to start the engine. For example, the driver demanded torque may be calculated based off a calibratable value associated with the accelerator pedal position to determine if the torque request is high. If the driver demanded torque is not determined to be a high value based off the accelerator pedal position calibratable rate, the system may request information from other vehicle system/subsystems other than vehicle propulsive torque to determine whether the engine should be turned on to provide additional power/torque at step 312. If a vehicle subsystem is requesting the engine to start, the hybrid powertrain system may determine that a bump start may initiate the engine starting event at step 314.

At step 316, if the system determines that the impeller speed is high, the start method selected to enable the engine in a hybrid powertrain system may be the bump start. If the impeller speed is low based on a calibratable and/or pre-defined value, the system may determine that the ramp start method may enable the engine start in a hybrid powertrain system at step 318.

At step 317, if the system determines that the driver demand is low, the start method selected to enable the engine in a hybrid powertrain system may be the bump start. If the driver demand is not low based on a calibratable and/or predefined value, the system may determine that the ramp start method may enable the engine start in a hybrid powertrain system at step 318.

Figure 4:
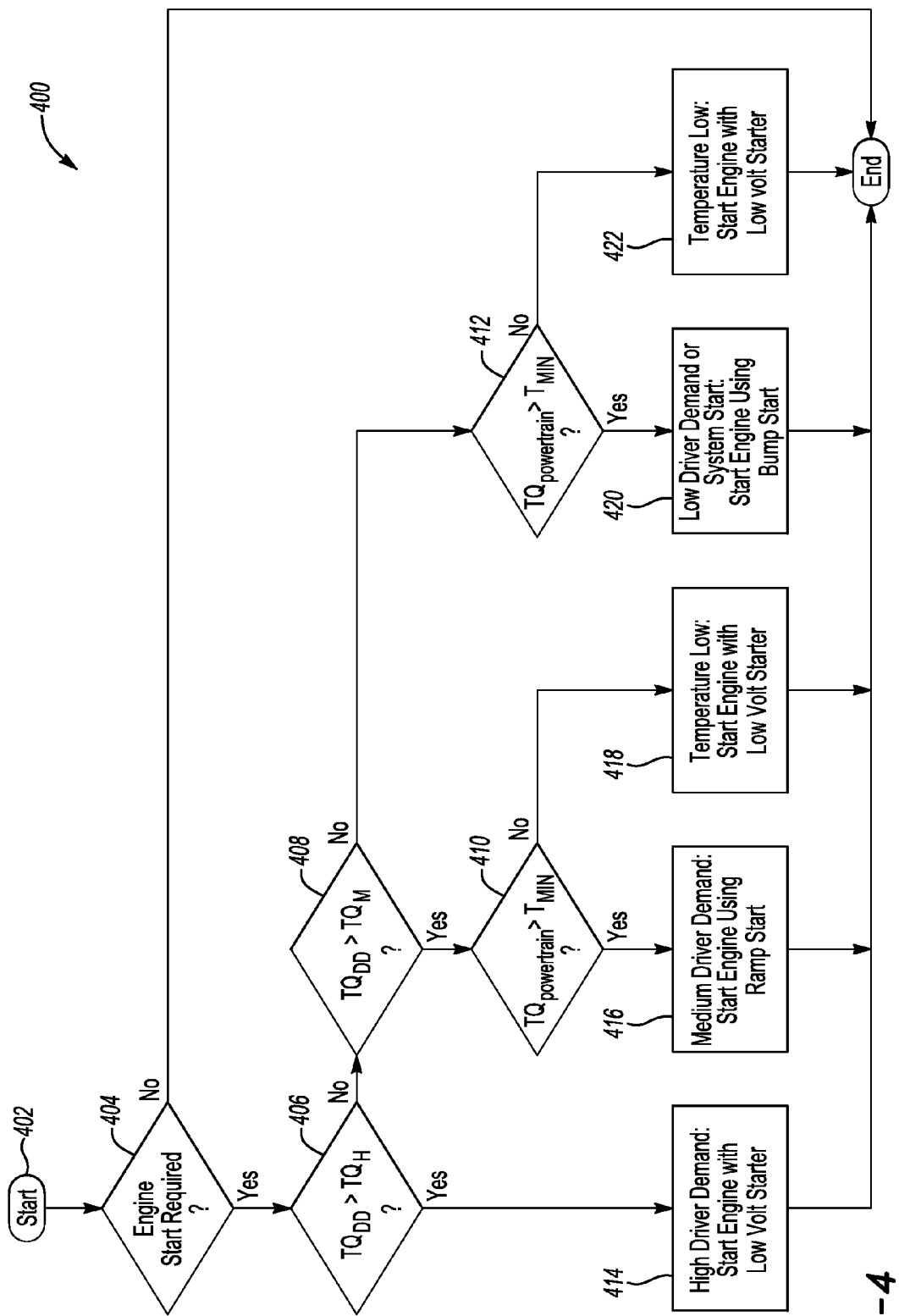
FIG. 4 is a flow chart of an algorithm for determining an engine start strategy for a hybrid electric vehicle.

FIG. 4 is a flow chart of an algorithm for determining an engine start strategy for a hybrid electric vehicle. In this example, the algorithm may choose the engine start method based on, but not limited to, vehicle system controls, driver demand, and/or state of charge of the hybrid battery system. The engine start methods may include, but is not limited to, ramp start, bump start, and/or starter motor. The starter motor method of starting an engine may include, but is not limited to, a low voltage starter motor.

At step 402, the hybrid powertrain system may receive signals indicating one or more system and/or subsystems requesting that the engine be turned on. If the system receives a request that the engine start is required for the hybrid powertrain system, it may proceed to check for additional parameters and/or variables to determine a method to start the engine at step 404.

At step 406, the system may determine if the driver demanded torque ($TQ_{DD}$) is greater than a pre-determined calibratable amount of hybrid powertrain torque available ($TQ_H$) to select an engine start method. If the driver demand is greater than the hybrid powertrain torque available, then the system may use the low voltage starter to start the engine at step 414. The low voltage starter may be used to turn an engine over for starting purposes via a flywheel.

At step 408, if the driver demanded torque ($TQ_{DD}$) is less than $TQ_H$, then the system may determine if the $TQ_{DD}$ is greater than a pre-determined calibratable medium torque value ($TQ_M$) to select an engine start method. If the $TQ_{DD}$ is greater than the $TQ_M$, then the system may initiate a demand for a ramp start or a low volt starter to be used for starting the engine.

At step 410, before determining whether to us a ramp start or a low voltage starter to turn on the engine, the system may monitor the powertrain oil temperature and/or coolant temperature ($T_{powertrain}$) and determine if it is greater than a calibratable minimum value ($T_{MIN}$). If the powertrain oil temperature and/or coolant temperature ($T_{powertrain}$) is greater than $T_{MIN}$, than the system may start the engine using the ramp start method at step 416. If the powertrain oil temperature and/or coolant temperature ($T_{powertrain}$) is less than $T_{MIN}$, than the system may start the engine using the low voltage starter motor instead of the ramp start at step 418.

If the driver demanded torque ($TQ_{DD}$) is less than $TQ_H$ and $TQ_M$, then the system may determine that a non-driver initiated system induced engine start is being requested due to several system factors including, but not limited to, low battery state of charge, driving maneuver, and/or one or more system conditions that require the engine to be turned on. If the driver demanded torque ($TQ_{DD}$) is less than $TQ_H$ and $TQ_M$, then the system may initiate a bump start or low volt starter based on powertrain oil temperature and/or coolant temperature ($T_{powertrain}$) at step 412.

At step 420, if powertrain oil temperature and/or coolant temperature ($T_{powertrain}$) is greater than a calibratable minimum value ($T_{MIN}$), the bump start method may be used to start the engine. If powertrain oil temperature and/or coolant temperature ($T_{powertrain}$) is less than a calibratable minimum value ($T_{MIN}$) the low voltage starter method may be used to start the engine at step 422.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A powertrain method comprising:
  by a controller,
    responsive to an engine start request and an engine temperature greater than a threshold, increasing a clutch pressure start an engine without a starter motor,
    responsive to an impeller speed greater than a calibratable speed, reducing the clutch pressure, and
    responsive to an engine start request and the engine temperature less than the threshold, operating the starter motor to start the engine without an electric machine.
2. The powertrain method of claim 1 wherein the engine temperature is engine coolant temperature.
3. The powertrain method of claim 1 wherein the engine temperature is transmission oil temperature.

4. The powertrain method of claim 1 further comprising, responsive to driver demand torque less than a predefined torque value, reducing the clutch pressure to reduce torque transferred to zero.

5. The powertrain method of claim 1 further comprising, responsive to driver demand torque greater than a predefined torque value, maintaining the clutch pressure to maintain torque transferred.

6. The powertrain method of claim 1 wherein the calibratable speed is 2100 RPM.

7. A powertrain comprising:
an engine; and
a controller programmed to
responsive to a start request and an engine temperature greater than a threshold, increase a clutch pressure to start the engine without a starter motor,
responsive to an impeller speed greater than a calibratable speed, reduce the clutch pressure, and
responsive to a start request and the engine temperature less than the threshold, operate the starter motor to start the engine without an electric machine.

8. The powertrain of claim 7 wherein the controller is further programmed to, responsive to driver demand torque less than a predefined torque value, reduce the clutch pressure to reduce torque transferred to zero.

9. The powertrain of claim 7 wherein the controller is further programmed to, responsive to driver demand torque greater than a predefined torque value, maintain the clutch pressure to maintain torque transferred.

10. The powertrain of claim 7 wherein the engine temperature is engine coolant temperature.

11. The powertrain of claim 7 wherein the engine temperature is transmission oil temperature.

\* \* \* \* \*